(12) United States Patent
Olsen et al.

(10) Patent No.: US 7,911,446 B2
(45) Date of Patent: Mar. 22, 2011

(54) NETWORKED KEYBOARD AND MOUSE DRIVERS

(75) Inventors: Jesse D. Olsen, San Diego, CA (US); Terry Martin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1035 days.

(21) Appl. No.: 10/890,636

(22) Filed: Jul. 13, 2004

(65) Prior Publication Data
US 2006/0015598 A1 Jan. 19, 2006

(51) Int. Cl.
*G06F 3/33* (2006.01)
(52) U.S. Cl. .......................... 345/157; 345/161
(58) Field of Classification Search .................. 345/156, 345/157, 1.1, 2.1, 2.2, 2.3, 701, 161, 810; 715/734, 733, 737, 751–754, 748, 705, 801, 715/762; 709/223, 213, 216, 218, 205, 227, 709/204, 207, 230, 224, 238, 231; 700/11; 707/103; 370/316, 248, 251; 348/553, 4.07; 235/462.08; 358/1.9; 725/47; 180/333; 455/426.1
See application file for complete search history.

(56) References Cited

U.S. PATENT DOCUMENTS

| | | | | |
|---|---|---|---|---|
| 4,760,458 A | * | 7/1988 | Watanabe et al. .............. | 358/537 |
| 5,793,630 A | * | 8/1998 | Theimer et al. .................. | 700/11 |
| 5,838,383 A | * | 11/1998 | Chimoto et al. ............... | 348/553 |
| 5,877,757 A | * | 3/1999 | Baldwin et al. ................ | 715/705 |
| 5,964,834 A | * | 10/1999 | Crutcher ....................... | 709/213 |
| 6,029,238 A | | 2/2000 | Furukawa | |
| 6,191,807 B1 | * | 2/2001 | Hamada et al. ............. | 348/14.07 |
| 6,209,021 B1 | * | 3/2001 | Ahimovic et al. ............. | 709/204 |
| 6,373,500 B1 | * | 4/2002 | Daniels ......................... | 345/632 |
| 6,469,690 B1 | * | 10/2002 | Abraham et al. ............. | 345/156 |
| 6,523,072 B1 | | 2/2003 | Howarth et al. | |
| 6,546,420 B1 | * | 4/2003 | Lemler et al. .................. | 709/224 |
| 6,550,562 B2 | * | 4/2003 | Brandt et al. ................. | 180/333 |
| 6,636,892 B1 | * | 10/2003 | Philyaw ........................ | 709/217 |
| 6,665,269 B1 | * | 12/2003 | Schmitz ........................ | 370/251 |
| 6,754,715 B1 | * | 6/2004 | Cannon et al. ................ | 709/231 |
| 6,768,721 B1 | * | 7/2004 | Schmitz et al. ............... | 370/248 |
| 6,807,562 B1 | * | 10/2004 | Pennock et al. .............. | 709/204 |
| 7,076,505 B2 | * | 7/2006 | Campbell ........................... | 1/1 |
| 7,080,127 B1 | * | 7/2006 | Hickman et al. .............. | 709/208 |
| 7,120,433 B2 | * | 10/2006 | Gladwin et al. ........... | 455/426.1 |
| 7,222,306 B2 | * | 5/2007 | Kaasila et al. ................. | 715/801 |
| 7,225,117 B1 | * | 5/2007 | Feldstein et al. ................ | 703/21 |
| 7,249,167 B1 | * | 7/2007 | Liaw et al. .................... | 709/218 |
| 7,302,489 B2 | * | 11/2007 | Kraft ............................. | 709/230 |
| 7,346,689 B1 | * | 3/2008 | Northcutt et al. ............. | 709/227 |
| 7,353,456 B2 | * | 4/2008 | Arend et al. ................... | 715/762 |
| 7,546,602 B2 | * | 6/2009 | Hejlsberg et al. ............. | 719/313 |
| 7,590,744 B2 | * | 9/2009 | Richardson et al. .......... | 709/227 |
| 2001/0003846 A1 | * | 6/2001 | Rowe et al. ..................... | 725/47 |
| 2002/0006117 A1 | * | 1/2002 | Duske et al. .................. | 370/316 |
| 2002/0080171 A1 | * | 6/2002 | Laferriere et al. ............. | 345/751 |
| 2002/0089488 A1 | * | 7/2002 | McBrearty et al. ........... | 345/157 |
| 2002/0103882 A1 | * | 8/2002 | Johnston et al. .............. | 709/218 |
| 2002/0140717 A1 | * | 10/2002 | Ho ................................ | 345/701 |
| 2003/0154212 A1 | * | 8/2003 | Schirmer et al. .......... | 707/103 R |

(Continued)

*Primary Examiner* — Prabodh M Dharia

(57) ABSTRACT

In an embodiment, a method of controlling a computer in a network, includes: moving a cursor to a designated area of a screen of a first computer; receiving an input in a peripheral device associated with the first computer; transmitting the input as a packet across a network to a second computer; and receiving and processing the packet on the second computer so that the input in the peripheral device is used to control the second computer.

15 Claims, 4 Drawing Sheets

U.S. PATENT DOCUMENTS

| | | | |
|---|---|---|---|
| 2003/0167307 A1* | 9/2003 | Filepp et al. | 709/205 |
| 2003/0208627 A1* | 11/2003 | Tognazzini | 709/248 |
| 2004/0012639 A1* | 1/2004 | Arend et al. | 345/810 |
| 2004/0099741 A1* | 5/2004 | Dorai et al. | 235/462.08 |
| 2004/0189602 A1* | 9/2004 | Scott et al. | 345/156 |
| 2005/0027811 A1* | 2/2005 | Kraft | 709/207 |
| 2005/0066000 A1* | 3/2005 | Liaw et al. | 709/204 |
| 2005/0068295 A1* | 3/2005 | Schottler et al. | 345/161 |
| 2005/0132087 A1* | 6/2005 | Glinski et al. | 709/238 |
| 2005/0193143 A1* | 9/2005 | Meyers et al. | 709/238 |
| 2006/0012810 A1* | 1/2006 | Postle et al. | 358/1.9 |
| 2007/0103984 A1* | 5/2007 | Kavuri et al. | 365/185.17 |

* cited by examiner

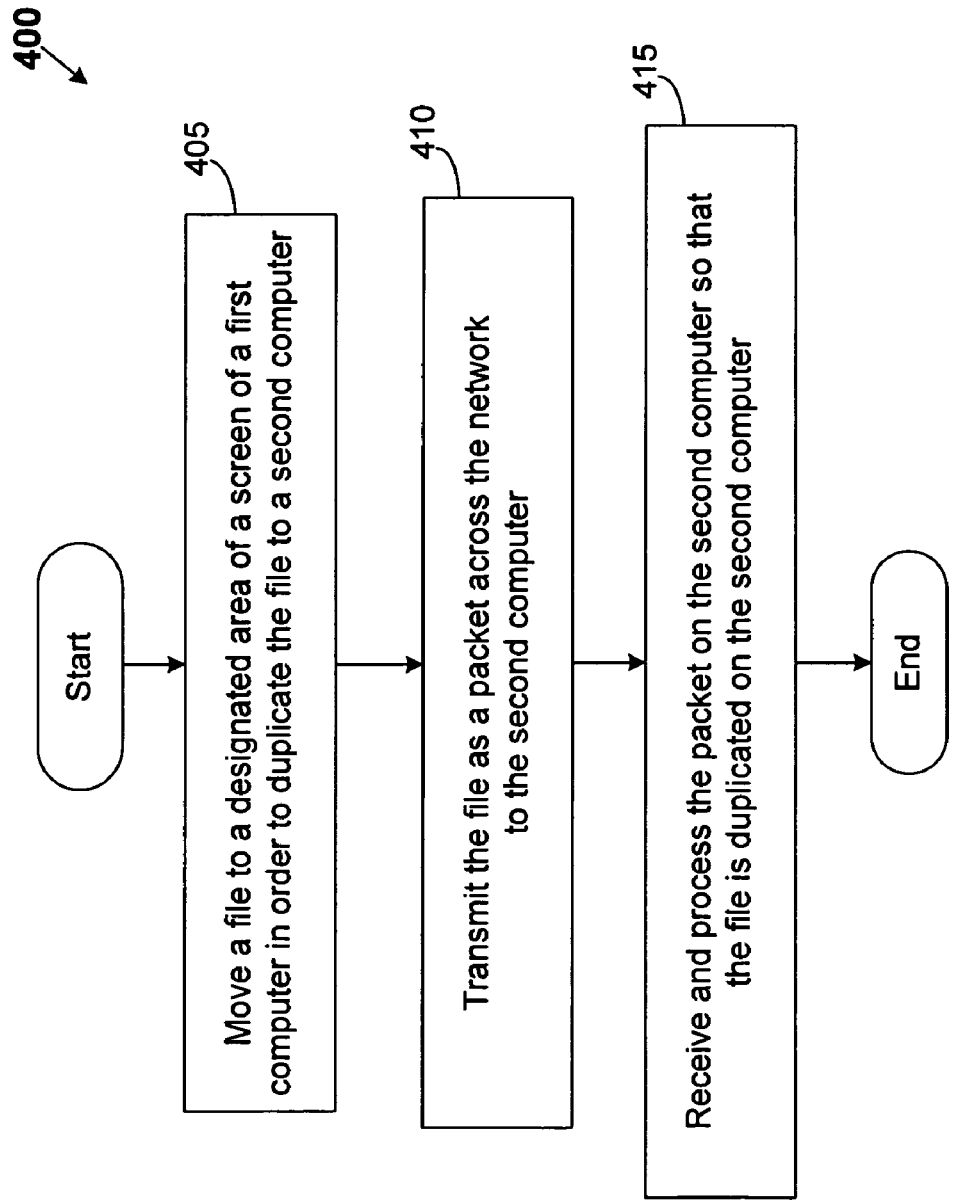

NETWORKED KEYBOARD AND MOUSE DRIVERS

TECHNICAL FIELD

Embodiments of the present invention relate generally to computer systems, and more particularly to a network keyboard and mouse driver.

BACKGROUND

Currently, if a user would like to use (or control) more than one personal computer at the same time, then the user has the following options. First, the user can manually switch between multiple sets of keyboards and cursor control devices (e.g., mice), where each keyboard and cursor control device will control one of the personal computers. Second, the user can use a switch box to switch one keyboard and mouse between the multiple computers. Third, the user can use a product such as, for example, NetMeeting from MICROSOFT CORPORATION, in order to access another computer with one monitor. The NetMeeting product is a software application for audio and video conferencing, and offers sharing of desktop video, audio, chat, and file transfer functionality. Fourth, the user can log into a machine (e.g., a UNIX machine), but will not have graphical access. Fifth, the user can use a product, such as, for example, ReflectionX in order to view the graphical content of another machine. The ReflectionX product connects a personal computer user to graphical and character-based applications on UNIX, LINUX and OpenVMS hosts.

Some conventional programs allow the user to view the other screen in a window (rather than taking up the entire screen), so that the user can technically view more than one screen at a time, but the screens will then "overlap" each other and share the same monitor. However, none of the conventional programs permit each of the computer screens to be viewed on its own separate monitor, connected to its own computer, and controlled by a single mouse & keyboard. Furthermore, none of the above products permits a user to access multiple computers with a single keyboard and cursor control device (e.g., mouse) and permit the user to view and control the multiple computers with the single keyboard and cursor control device.

Therefore, the current technology is limited in its capabilities and suffers from at least the above constraints and deficiencies.

SUMMARY OF EMBODIMENTS OF THE INVENTION

In an embodiment of the invention, a method of controlling a computer in a network, includes:

moving a cursor to a designated area of a screen of a first computer;

receiving an input in a peripheral device associated with the first computer;

transmitting the input as a packet across a network to a second computer; and receiving and processing the packet on the second computer so that the input in the peripheral device is used to control the second computer.

In another embodiment of the invention, an apparatus for controlling a computer in a network, includes:

a first computer including a screen with a designated area for receiving a cursor and a peripheral device associated with the first computer;

a network configured to transmit an input to the peripheral device as a packet; and a second computer configured to receive and process the packet so that the input in the peripheral device is used to control the second computer.

In yet another embodiment of the invention, a method of copying a file in a computer in a network, includes:

moving a file to a designated area of a screen of a first computer;

transmitting the file as a packet across a network to a second computer; and receiving and processing the packet on the second computer so that the file is copied in the second computer.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a flowchart of a method of copying a file from one computer to another computer across a network, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
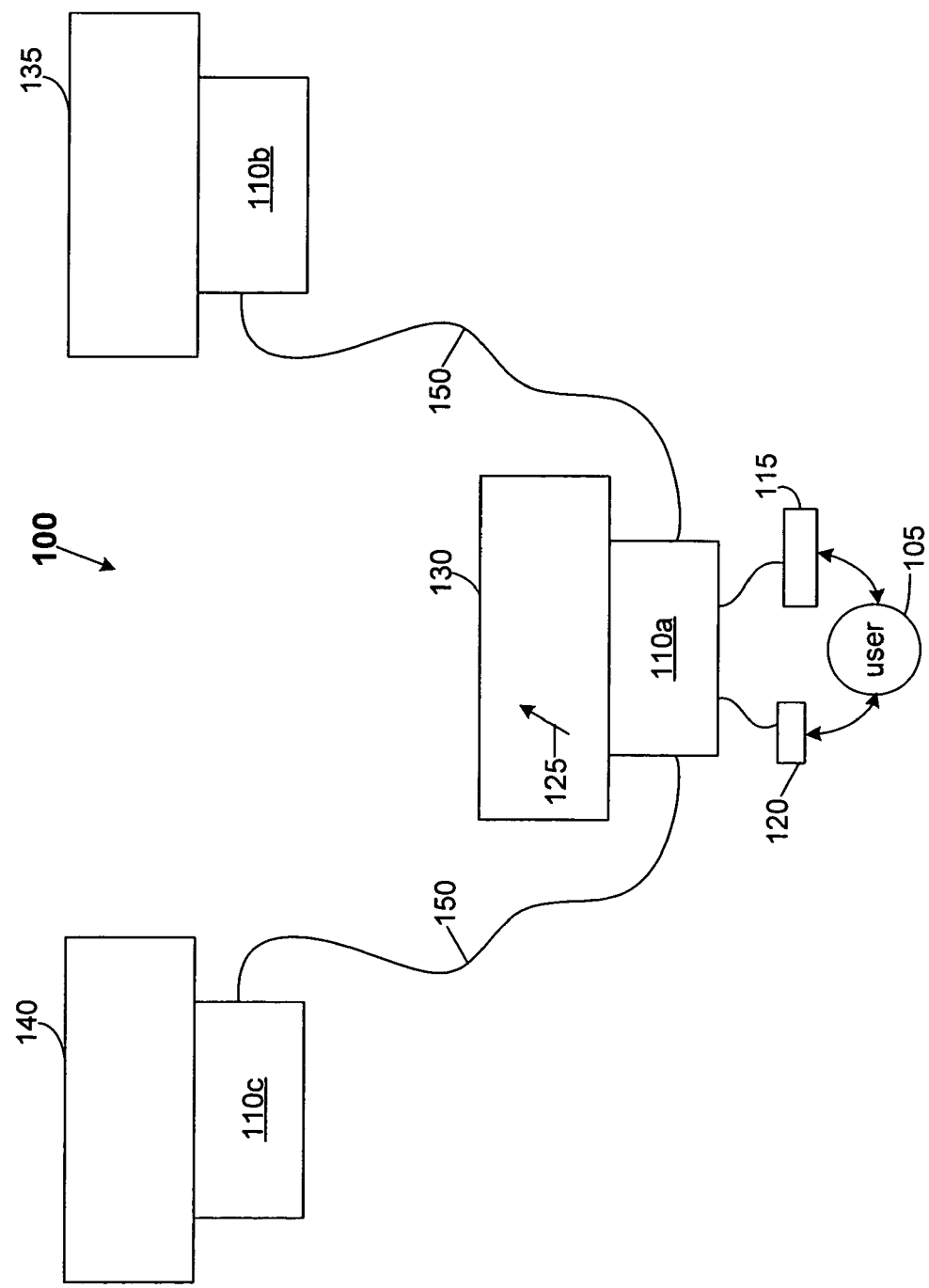
FIG. 1 is a functional block diagram of a system in accordance with an embodiment of the invention.

FIG. 1 is an apparatus (or system) 100 in accordance with an embodiment of the invention. An embodiment of the invention advantageously provides a system (or apparatus) 100 that permits a user 105 to access multiple computers (computers 110a, 110b, and 110c in the example of FIG. 1) with a single keyboard 115 and cursor control device (e.g., mouse) 120 and permits the user 105 to view and control the multiple computers with the single keyboard 115 and cursor control device 120. In the description herein, the cursor control device 120 will be referred to as a mouse 120, although other types of cursor control devices may be used to control a mouse cursor 125 in the screen 130 of the computer 110a. Also, in other embodiments of the invention, the mouse 120 may be omitted, and the keyboard 115 may be used to control the mouse cursor 125.

An embodiment of the invention permits the user 105 to work or control a first computer 110a. If the user 105 receives a visual indicator or notification on a second computer 110b, where the indicator or notification notifies the user 105 of an electronic mail (email) (or other information) that was received on the second computer 110*b*, then the user 105 can use the single keyboard 115 and mouse 120 to access and control the second computer 110*b* and read the received email (or other information) or perform other activities on the second computer 110*b*.

In another configuration of the system 100, the third computer 110*c* may be omitted. In another configuration of the system 100, more than three computers can be included in the network.

The computers 100*a*-100*c* are connected by a network 150. Typically, the network 150 is a Local Area Network (LAN). In other embodiments, the network may be a Wide Area Network (WAN) such as, for example, the Internet, or any other type of network having a protocol for transmitting data.

As another example, an embodiment of the invention is beneficial to a user 105 who is running different tests on different computers. The user 105 can use the single keyboard 115 and mouse 120 to control a first computer 110*a* that may be running a test and then use the single keyboard 115 and mouse 120 to access and control the second computer 110*c* that may be running another test. The user 105 can then use the single keyboard 115 and mouse 120 to again access and control the first computer 110*a*, and switch in controlling between the first computer 110*a* and second computer 110*b* by use of the single keyboard 115 and mouse 120.

An embodiment of the networked keyboard driver and networked mouse driver allows a user 105 to move a mouse cursor 125 off the screen 130 of the first computer 110*a* and onto the screen 135 of the second computer 110*b* (or onto the screen 140 of the third computer 110*c* if the computer 110*c* is implemented in the network 150). When the user 105 causes the cursor 125 to move off the screen 130, the focus and control of the user 105 would turn to the second computer 110*b* (or to the third computer 110*c*), so that the keystrokes in the keyboard 115 by the user 105 would be received by the second computer 110*b* or the third computer 110*c*. Because a method of the invention would be processed over the network 150, the multiple computers in FIG. 1 are not required to be the same types of machine and may be of different types from different vendors. In other words, the computers can be different types of machines with different types of operating systems.

Figure 2:
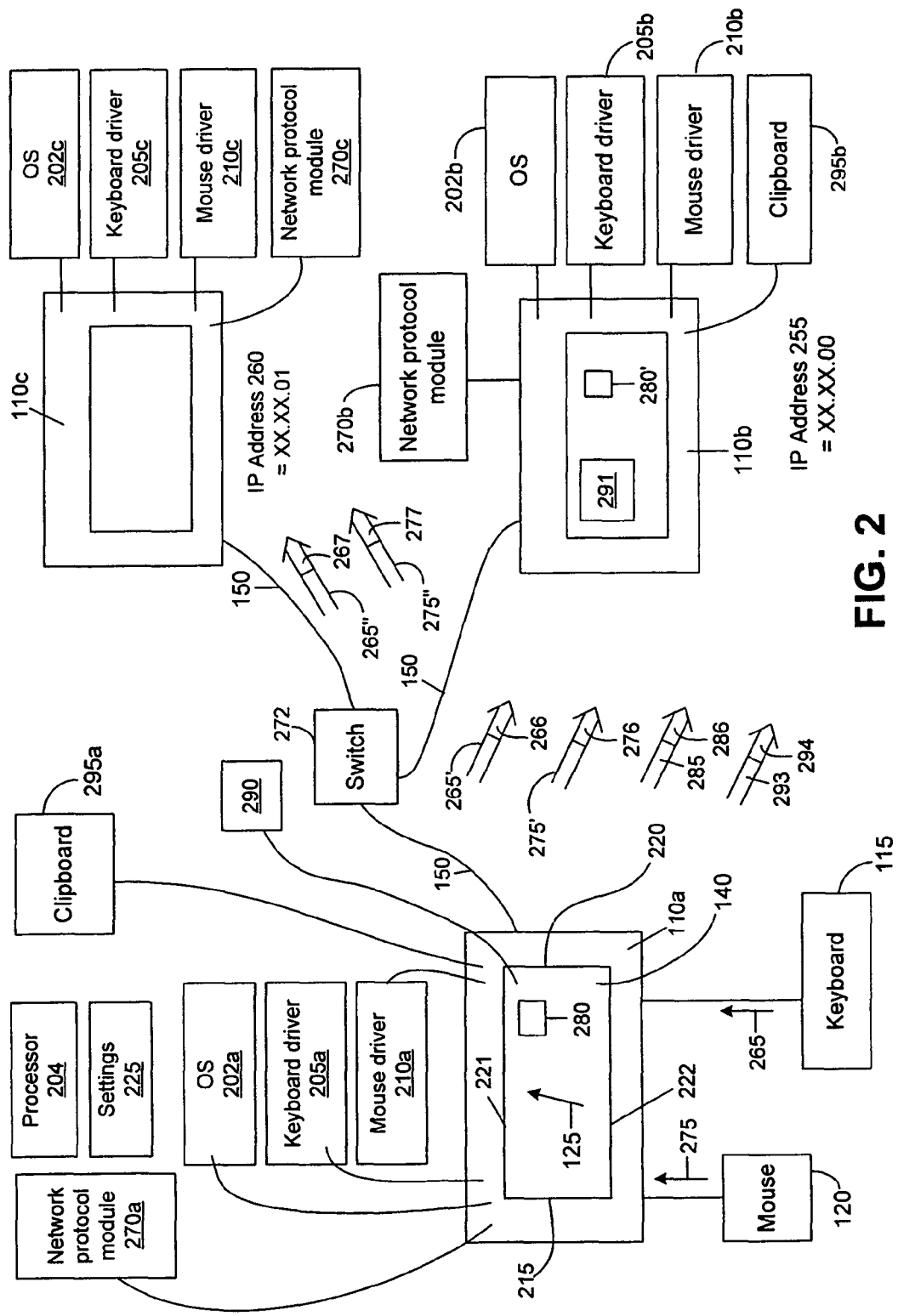
FIG. 2 is a block diagram that shows additional details of the system of FIG. 1, in accordance with an embodiment of the invention.

FIG. 2 is a block diagram that shows additional details of the system 100 of FIG. 1, in accordance with an embodiment of the invention. The computer 110*a* includes an operating system 202*a*, which typically provides essential services such as, for example, memory management, process and task management, disk management, or other services. A processor 204 executes the operating system 202*a* and controls the processing in the computer 110*a*. The computer 110*a* also includes a network keyboard driver 205*a* and networked mouse driver 210*a*, as described below, in accordance with an embodiment of the invention. The networked keyboard driver 205*a* and networked mouse driver 210*a* have the capability of and can function like standard keyboard drivers and standard mouse drivers. However, the networked keyboard driver 205*a* and networked mouse driver 210*a* have the additional functionalities when the mouse cursor 125 leaves the local computer's screen area 140. When the mouse cursor 125 leaves the local screen area and enters a designated screen area (e.g., left edge 215 or right edge 220), then the networked keyboard driver 205*a* and networked mouse driver 210*a* would look up the settings 225 that the user 105 has specified to determine which particular computer that the mouse cursor will move to. As mentioned below, the designated screen area could be other portions of the screen 140, such as, for example, the top screen edge 221 or/and lower screen edge 221 or other parts of the screen 140.

The "networked drivers" (keyboard driver 205*a* and mouse driver 210*a*) are also standard drivers, which control where the mouse pointer 125 is on the screen 140, and thus would be aware where the mouse pointer 125 is currently located on the screen 140. If the mouse pointer's x-position becomes 0, for example, then the pointer 125 has hit the left edge 215 of the screen 140, which would trigger the mouse driver 210*a* to effectively move the pointer to the computer 110*c* to the left.

Typically, the settings 225 are configuration data that is stored in a memory of the computer 110*a* (typically on disk (hard drive)) and loaded into the operating system's memory when the networked drivers are started up. The settings 225 may be in, for example, a lookup table (in memory) that can be quickly searched by the operating system 202*a*. For example, the user 105 might specify that if the user moves the mouse cursor 125 off the screen to the right (i.e., moves the cursor to the right edge 220), then the user can use the keyboard 115 and mouse 120 to control a particular remote computer with a given Internet Protocol (IP) address as configured in the settings 225. For example, if the user 105 moves the cursor 125 to the right edge 220 of the computer screen 140, then the user 105 can access and control the computer 110*b* with an example IP address 255 of xx.xx.00. As another example, if the user 105 moves the cursor 125 to the left edge 215 of the computer screen 140, then the user 105 can access and control the computer 110*c* with an example IP address 255 of xx.xx.01.

In another embodiment, control of the remote computers 110*b* and 110*c* by the user 105 is not limited to contact of the cursor 125 to the right edge 220 and left edge 215, respectively. Other designated areas in the screen 140 can be configured to permit the user 105 to control the remote computers 110*b* and 110*c*. For example and not by way of limitation, when the mouse cursor 125 comes into contact with the top edge 221 of the screen 140, then the user 105 can control the computer 110*b*. As another example and not by way of limitation, when the mouse cursor 125 comes into contact with the bottom edge 222 of the screen 140, then the user 105 can control the computer 110*c*. Other areas on the screen 140 may be designated for controlling the remote computers 110*b* and 110*c*.

In an embodiment of the invention, when the cursor is moved off the screen (i.e., moved to the left edge 215 or moved to the right edge 220) by the user, then the drivers 205*a* and 210*a* would send information about cursor 120 movements and keyboard strokes (which is input by user 105 into the keyboard 115) over the network 150 to the other computer's mouse and keyboard drivers, which would update the mouse location and send keystrokes that are input by the user 105.

As an example, assume that the user 105 moves the mouse cursor 125 to the right screen edge 220 by use of the mouse 120. Assume further that the data in the settings 225 will permit the user to control the computer 110*b* if the mouse cursor 125 is moved to the right screen edge 220. When the user 105 inputs data (e.g., presses a button) in the keyboard 115, a scan code 265 that is responsive to the input in keyboard 115 is processed by the keyboard driver 205*a*. Since the mouse cursor 125 was moved by the user 105 to the right screen edge 220, the keyboard driver 205*a* and the network protocol module 270*a* will process the scan code 265 into a packet format with an address header that indicates the IP address 255 of the second computer 110*b*. The network protocol module 270*a* performs processing and transmitting of packets, as known to those skilled in the art. When the scan code 265 is formatted into the packet 265', the network switch 272 will permit the packet 265' to be transmitted to the destination computer 110b, based upon the IP address 255 that is in the header 266 of the packet 265'. The network protocol module 270b in the computer 110b will process and parse the received packet 265'. The keyboard driver 205b in the computer 110b will process the received packet 265' so that the user input in the keyboard 115 (of computer 110a) is received in and processed by the second computer 110b. Therefore, the user 105 can control the second computer 110b by use of the keyboard 115 of the first computer 110a.

When the user 105 inputs data (e.g., presses a button) in the mouse 120, a scan code 275 that is responsive to the input in the mouse 120 is processed by the mouse driver 210a. The mouse driver 210a and the network protocol module 270a will process the scan code 275 into a packet format with an address header that indicates the IP address 255 of the second computer 110b. When the scan code 275 is formatted into the packet 275', the network switch 272 will permit the packet 275' to be transmitted to the destination computer 110bbased upon the IP address 255 that is in the header 276 of the packet 275'. The network protocol module 270b in the computer 110b will process and parse the received packet 275'. The mouse driver 210b in the computer 110b will process the received packet 275' so that the user input in the mouse 120 (of computer 110a) is received in and processed by the second computer 110b. Therefore, the user 105 can control the second computer 110b by use of the mouse 120 of the first computer 110a. Other types of peripheral device coupled to the first computer 110a can be used to control the second computer 110bby use of methods in accordance with embodiments of the invention.

As another example, assume that the user 105 moves the mouse cursor 125 to the left screen edge 215 by use of the mouse 120. Assume further that the data in the settings 225 will permit the user to control the computer 110c if the mouse cursor 125 is moved to the left screen edge 215 and if the computer 110c is actually implemented in the network 150. When the user 105 inputs data (e.g., presses a button) in the keyboard 115, a scan code 265 that is responsive to the input in keyboard 115 is processed by the keyboard driver 205aSince the mouse cursor 125 was moved by the user 105 to the left screen edge 215, the keyboard driver 205a and the network protocol module 270a will process the scan code 265 into a packet format with an address header that indicates the IP address 260 of the third computer 110c. When the scan code 265 is formatted into the packet 265", the network switch 272 will permit the packet 265" to be transmitted to the destination computer 110c, based upon the IP address 260 that is in the header 267 of the packet 265". The network protocol module 270c in the computer 110c will process and parse the received packet 265". The keyboard driver 205c in the computer 110c will process the received packet 265" so that the user input in the keyboard 115 (of computer 110a) is received in and processed by the third computer 110c. Therefore, the user 105 can control the third computer 110c by use of the keyboard 115 of the first computer 110a.

As another example, assume that the user 105 moves the mouse cursor 125 to the left screen edge 215 by use of the mouse 120. Therefore, the user will be able to control the third computer 110c, as described above. When the user 105 subsequently inputs data (e.g., presses a button) in the mouse 120, a scan code 275 that is responsive to the input in the mouse 120 is processed by the mouse driver 210aThe mouse driver 210a and the network protocol module 270a will process the scan code 275 into a packet format with an address header that indicates the IP address 260 of the third computer 110c. When the scan code 275 is formatted into the packet 275", the network switch 272 will permit the packet 275" to be transmitted to the destination computer 110c, based upon the IP address 260 that is in the header 277 of the packet 275". The network protocol module 270c in the computer 110c will process and parse the received packet 275". The mouse driver 210c in the computer 110c will process the received packet 275" so that the user input in the mouse 120 (of computer 110a) is received in and processed by the third computer 110c. Therefore, the user 105 can control the third computer 110c by use of the mouse 120 of the first computer 110a.

It is noted that embodiments of the invention are not limited to computers that are adjacent to each other. For example, the system 100 can include three computers that are disposed in a row (left computer, middle computer, right computer), and the mouse 120 and keyboard 115 are physically connected to the left computer. The mouse 120 and keyboard 115 could be used to control the middle computer and the right computer, as long as the middle computer was configured to relay the mouse & keyboard events (packets) to the right computer, when the mouse reaches a designated area of the screen (e.g., the right edge of the screen). Otherwise stated, an embodiment of the invention can control an array of computers of virtually any size and in any suitable location. An embodiment of the invention could be used to control all of the computers in the array, regardless of where the mouse and keyboard are physically attached.

In another embodiment of the invention, a file 280 can be dragged and dropped from computer 110a to another computer (e.g., computer 110b) by the user 105, by use of the networked keyboard driver 205a and networked mouse driver 210aFor example, if the user 105 wants to move or copy a file 280 from computer 110a to computer 110bthe user 105 would simply drag the file 280 to the edge 220 of the monitor 140 by use of the mouse cursor 125. As a result, the file 280 will be dropped or copied as a new file 280" in the computer 110b. The file 280' would be an identical copy of the file 280. The file 280 may be, for example, a MICROSFT WORD document, a PDF format document, an EXCEL document, or any other suitable file formats that can be stored in a computer.

The dragging and dropping of files 280 between computers could be achieved by transmitting the files over the network 150 by use of, for example, the FTP protocol. As known to those skilled in the art, File Transfer Protocol (FTP) is a standard Internet protocol and is one of the simplest ways to exchange files between computers on the Internet. Like the Hypertext Transfer Protocol (HTTP), which transfers displayable Web pages and related files, and the Simple Mail Transfer Protocol (SMTP), which transfers e-mail files, FTP is an application protocol that uses the Internet's TCP/IP protocols (Transmission Control Protocol/Internet Protocol). FTP is commonly used to transfer Web page files from their creator to the computer that acts as their server for everyone on the Internet. It is also commonly used to download programs and other files to the user's computer from other servers. Basic FTP support is usually provided as part of a suite of programs that come with TCP/IP. In an embodiment of the invention, the network protocol module 270a in FIG. 2 may be configured to support FTP and TCP/IP.

When the user 105 drags the file 280 to the edge 220 of the screen 140, the network protocol module 270a would format the file 280 into a packet 285 with a header 286 containing the IP address 255 of the computer 110b. When the packet 285 is transmitted by the computer 110a into the network 150, the network switch 272 would forward the packet 285 to the computer 110b. The network protocol module 270b in the computer 110*b* would then process and parse the packet 285, so that the file 280' is created in the computer 110*b*.

As an option, a performance enhancement for the drag and drop of files would be to not FTP the file 280 over until a valid drop happens. A drag and drop operation could drop the file 280 onto an invalid drop target, in which case, the file should not be transmitted via FTP.

As known to those skilled in the art, a clipboard is special file or memory area (buffer) where data is stored temporarily before being copied to another location. Many word processors, for example, use a clipboard for cutting and pasting. As an option, along with remote mouse/keyboard control and drag/drop of files in the various methods described above, a "shared clipboard" functionality can be configured to operate between the computers that have been configured to work together. This permits the user 105 to, for example, "copy" text from a document 290 on one computer (e.g. computer 110*a*), and then "paste" that text into a document 291 on another computer (e.g., computer 110*b*). This functionality advantageously adds to the user's experience of a "virtual" computer formed by the several separate computers that are networked together.

Typically, the shared clipboard functionality is implemented based on the following and is similar to the implementation of the method of dragging/dropping of files as mentioned above. The content of the clipboard is transmitted via a packet 293 (with a header 294 that has the IP address of the destination computer 110*b*). When the user 105 goes from computer 110*a* to computer 110*b*, the original content of the clipboard on computer 110*b* could be saved in memory by a driver on computer 110*b*, then the content of the clipboard 295*b* on computer 110*b* could be filled with the content from the clipboard 295*a* on computer 110*a*. This way, a user could cut text from computer 110*a* and paste it onto computer 110*b*. When the user goes back to computer 110*a*, the saved/cached (original) content on computer 110*b* could then be put back into the clipboard of computer 110*b*. This way, if another user was using computer 110*b* before the user 105 had accessed it remotely, the content of the clipboard on computer 110*b* would be the same after it was used by the user 105. Another implementation would be to replace the content in the clipboard of computer 110*b*, and not save the original content of the clipboard.

As another option, if a user 105 is attempting to control one of the remote computers (e.g., computer 110*b*) that is currently being used by another user, then the remote computer could be controlled by just the local user, or by both the local user and remote user, depending on an implementation of an embodiment of the invention. The user 105 would not be able to control the computer 110*b* in one example implementation.

Figure 3:
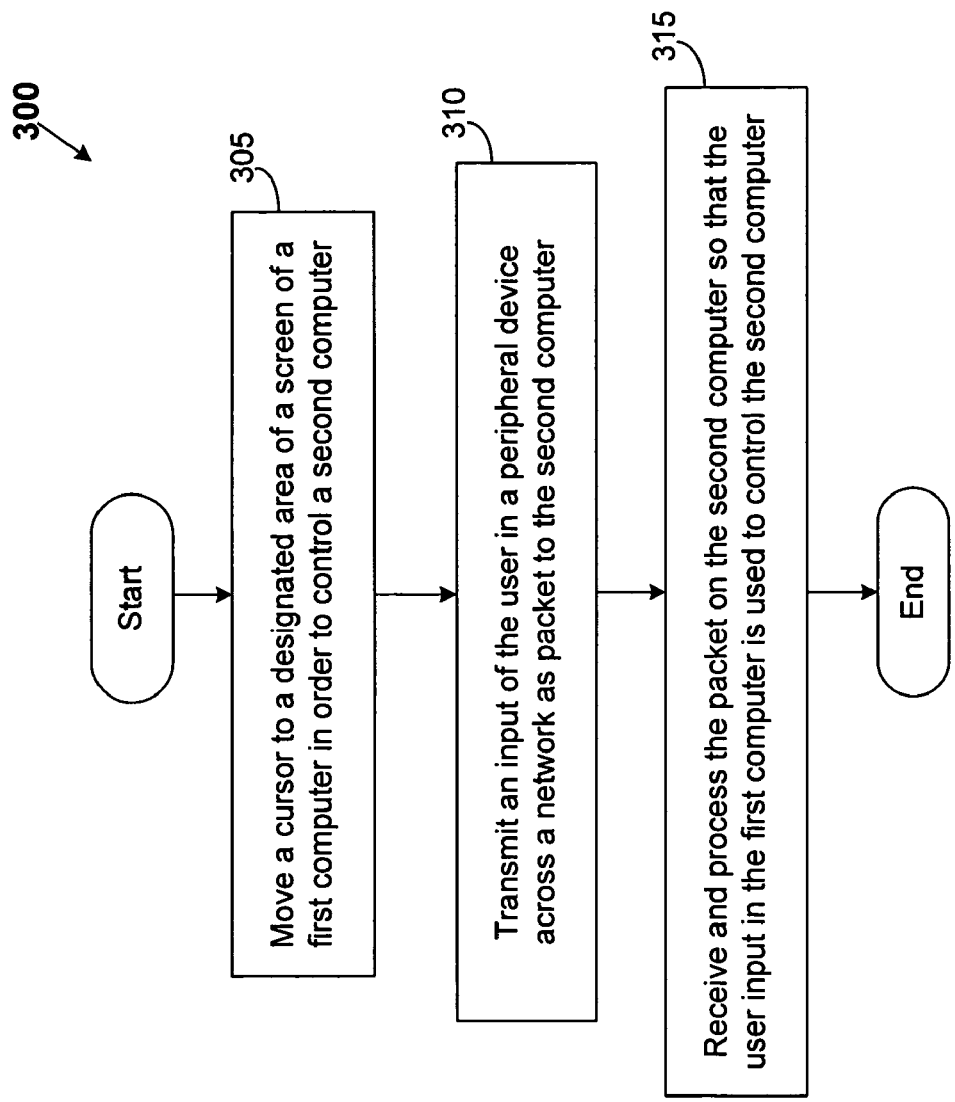
FIG. 3 is a flowchart of a method of controlling a computer in a network, in accordance with an embodiment of the invention.

FIG. 3 is a flowchart of a method 300 of controlling a computer in a network, in accordance with an embodiment of the invention. In step 305, a user would move a cursor to a designated area of a screen of a first computer in order to control a second computer. For example, a designated area of the screen of the first computer could be an edge portion of the screen.

In step 310, an input of the user in a peripheral device is transmitted as a packet across a network to the second computer. The peripheral device is coupled to or is integrated with the first computer. The peripheral device could be, for example, a keyboard or a cursor control device such as a mouse.

In step 315, the packet is received and processed on the second computer so that the user input in the first computer is used to control the second computer.

FIG. 4 is a flowchart of a method 400 of copying a file from one computer to another computer across a network, in accordance with an embodiment of the invention. In step 405, a user would move a file to a designated area of a screen of a first computer in order to duplicate the file to a second computer. For example, a designated area of the screen of the first computer could be an edge portion of the screen.

In step 410, the file is transmitted as a packet across a network to the second computer.

In step 415, the packet is received and processed on the second computer so that the file is duplicated on the second computer.

The network drivers 205*a* and 210*a* could also be configured to act as standard drivers. For example, a vendor could ship these drivers as the standard driver of the vendor. The drivers can be configured to become networked drivers if or when the user inputs the IP address of the computer(s) that will be in the network. This would have to be set up on both computers before it would work.

Therefore, an embodiment of the invention permits a user to view multiple computers, and to quickly and easily access any of these multiple computers by controlling the mouse and moving the cursor towards an appropriate monitor of a computer. The computers could be of different types (e.g., one computer can be a Unix server, and the other could be a Windows-based laptop), and the single mouse and keyboards could control the different types of computers if the computers are configured with the same type of networked keyboard and mouse drivers.

An embodiment of the inventions is also beneficial for notebook or laptop computers (or other types of portable computers). A network driver of an embodiment of the invention permits the user to advantageously avoid the use of a docking station, if the user has a desktop computer and a portable computer. The user can turn on and boot-up the desktop computer and portable computer and use the keyboard and mouse of the desktop in order to access and control the portable computer, instead of having to purchase an expensive and awkward docking station in order to control the portable computer.

The various software, engines, tools, or modules discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of controlling a computer in a network, the method comprising:
   positioning a cursor at a designated area of a display screen of a first computer;
   receiving first and second inputs in a keyboard or mouse associated with the first computer;
   processing the first input with a first keyboard or mouse driver in the first computer to thereby control the first computer;
   transmitting the second input in a packet across a network to a second computer with a network address;
   wherein positioning the cursor at the designated area selects the network address as a destination of the packet; and
   receiving and processing the packet on the second computer including processing the second input in the packet with a second keyboard or mouse driver in the second computer to thereby control the second computer.

2. The method of claim 1, wherein the packet includes a header with an Internet Protocol address of the second computer.

3. The method of claim 1, wherein the designated area is an edge of the screen.

4. The method of claim 1, further comprising:
   positioning the cursor at another designated area of the display screen of the first computer;
   receiving a third input in the keyboard or mouse associated with the first computer;
   transmitting the third input in another packet across the network to a third computer with another network address;
   wherein positioning the cursor at the another designated area selects the another network address as a destination of the packet; and
   receiving and processing the another packet on the third computer including processing the third input in the another packet with a third keyboard or mouse driver in the third computer to thereby control the third computer.

5. The method of claim 4, wherein the another designated area is another edge of the screen.

6. The method of claim 1, wherein the first computer includes a first screen, wherein the second computer includes a second screen, wherein the first screen presents a first image in response to processing of the first input by the first mouse or keyboard driver and wherein the second screen presents a second image in response to processing of the second input by the second mouse or keyboard driver.

7. An apparatus for controlling a computer in a network, the apparatus comprising:
   a first computer including a screen, the having a designated area configured to receive a cursor, a mouse or keyboard associated with the first computer configured to receive first and second inputs, and a mouse or keyboard driver configured to process the first input to thereby control the first computer;
   a network configured to transmit the second input in a packet; and
   a second computer with a network address and configured to receive and process the packet and including a second mouse or keyboard driver configured to process the second input in the packet to thereby control the second computer, wherein positioning the cursor to the designated area selects the network address as a destination of the packet.

8. The apparatus of claim 7, wherein the packet includes a header with an Internet Protocol address of the second computer.

9. The apparatus of claim 7, wherein the designated area is an edge of the screen.

10. The apparatus of claim 7, further comprising:
    wherein the mouse or keyboard is configured to receive a third input;
    wherein the network is configured to transmit the third input in another packet;
    a third computer with another network address;
    wherein if the cursor is moved to another designated area of the screen of the first computer, then the third computer receives and processes the another packet including processing the third input in the another packet with a third mouse or keyboard driver in the third computer to thereby control the third computer and wherein moving the cursor to the another designated area identifies the another network address as a destination of the packet.

11. The apparatus of claim 7, wherein the second computer includes a second screen and wherein the second mouse or keyboard driver is configured to process the second input in the packet to control the second computer so as to vary an image presented by the second screen.

12. An article of manufacture, comprising:
a machine-readable medium having stored thereon instructions to:
- move a cursor to a designated area of a screen of a first computer;
- receive first and second inputs in a mouse or keyboard associated with the first computer;
- process the first input with a first mouse or keyboard driver in the first computer to thereby control the first computer;
- transmit the second input in a packet across a network to a second computer with a network address;
- wherein moving the cursor to the designated area identifies the network address as a destination of the packet; and
- receive and process the packet on the second computer including processing the second input in the packet with a second mouse or keyboard driver in the second computer to thereby control the second computer.

13. The article of manufacture of claim 12, wherein the second computer includes a second screen, wherein the second screen presents an image in response to processing of the packet by the second mouse or keyboard driver.

14. An apparatus for controlling a computer in a network, the apparatus comprising:
- means for moving a cursor to a designated area of a screen of a first computer;
- means for receiving first and second inputs in a mouse or keyboard associated with the first computer;
- means for processing the first input with a first mouse or keyboard driver in the first computer to thereby control the first computer;
- means for transmitting the input in a packet across a network to a second computer with a network address;
- wherein moving the cursor to the designated area identifies the network address as a destination of the packet; and
- means for receiving and for processing the packet on the second computer including processing the second input in the packet with a second mouse or keyboard driver in the second computer to thereby control the second computer.

15. The apparatus of claim 14, wherein the second computer includes a second screen and wherein the second mouse or keyboard driver is configured to process the second input in the packet to control the second computer so as to vary an image presented by the second screen.

* * * * *